United States Patent Office 3,434,912
Patented Mar. 25, 1969

3,434,912
SELF-SUSTAINING, THIN, CRACK-FREE SHEET
OF INORGANIC AEROGEL
John B. Peri, Chesterton, Ind., assignor to Standard Oil
Company, Chicago, Ill., a corporation of Indiana
No Drawing. Continuation-in-part of application Ser. No.
208,618, July 9, 1962, which is a continuation-in-part
of application Ser. No. 842,227, Sept. 25, 1959. This
application Nov. 22, 1965, Ser. No. 509,226
Int. Cl. B29c 23/00; B32b 9/00
U.S. Cl. 161—46                                6 Claims

ABSTRACT OF THE DISCLOSURE

Self-sustaining, thin, crack-free sheets of inorganic aerogel prepared by gelling a thin layer of an inorganic sol floating on the surface of an immiscible support liquid having a density greater than the density of the sol to form a gel sheet on said support liquid; displacing the sol liquid in the gel sheet with a second liquid; and removing the second liquid from the gel sheet without the formation of a two-phase liquid-vapor system therein by vaporization at a temperature which is at least its critical temperature and a pressure which is at least its critical pressure.

---

This is a continuation-in-part of application Ser. No. 208,618, filed July 9, 1962, now abandoned which in turn is a continuation-in-part of application Ser. No. 842,227, filed Sept. 25, 1959, now abandoned.

This invention relates to aerogels made from inorganic sols. More particularly, the invention concerns thin self-sustaining sheets of aerogels, such sheets being characterized by freedom from cracks and highly desirable optical, internal surface area and mechanical strength properties.

Studies of absorbed molecules by spectroscopic or infrared techniques are of wide current interest. However, the available absorbents have imposed limitations on such studies. The transmission of radiant energy through powdered absorbents is poor because of losses from scattering and reflection. Pressed discs of powdered material give improved radiant energy transmission but are poorly permeated by gases and exhibit changes in surface characteristics. Leached borosilicate glass gives still better radiant energy transmission but is of restricted interest because of its composition.

Thin, uncracked sheets of dry inorganic aerogels are superior absorbents for spectroscopic and infrared studies. However, when preparations of thin sheets of inorganic aerogels are attempted by conventional means considerable cracking and fragmentation occurs because of internal stresses set up by shrinkage during the gelation and drying steps in their manufacture. It has heretofore been impossible to prepare large, thin, uncracked self-sustaining sheets of inorganic aerogels, much less to prepare such sheets having desirable optical properties, the usual form of aerogels produced by the methods of the prior art being powdered or granulated solids.

In addition to their utility in analytical studies, the inorganic aerogel sheets of my invention are useful as micro-porous filters, as wicks in high temperature burners, as catalyst supports or as molecular sieves for the separation of large molecules or colloidal components from various mixtures. The aerogel sheets are also useful as catalysts or supports for catalysts in heterogeneous photochemical reactions where there is the necessity for uniform and efficient distribution of infrared, visible or near-ultraviolet radiation throughout the reaction mixture. Also, because of their very desirable optical properties, heat resistance, and mechanical strengths, self-sustaining thin inorganic aerogel sheets of my invention find special utility as insulating refractory window materials, as optically clear filters for the collection of microscopic solids or bacteria in air pollution or biological studies which can be subsequently studied directly under a microscope and as an insulating inner layer having high strength in compression which permits the evacuation of the space between the outer panes of "Thermopane"-type windows.

It is an object of my invention to provide self-sustaining sheets of inorganic aerogels. It is a further object of my invention to provide such sheets which are free from cracks. It is an additional object of my invention to provide thin, uncracked sheets of inorganic aerogels which sheets are characterized by parallel surfaces, improved light transmission and uniform density. Yet another object of my invention is to provide highly transparent inorganic aerogel plates having high internal surface area and porosity. Still another object of my invention is to provide self-sustaining thin, uncracked inorganic aerogel plates having desirable optical properties, desirable porosity and internal surface area characteristics and having improved mechanical strength characteristics especially at high temperatures. Other objects of my invention will become apparent in the course of the following description.

It has been discovered that self-sustaining, thin inorganic aerogel sheets having the aforementioned desirable properties can be prepared by gelling a layer of the corresponding sol under conditions which permit essentially free contraction of the sol as it is converted to a sheet of gel and separating the sol liquid from the gel sheet under conditions which prevent the formation of mechanical stresses in the sheet and which avoid any substantial reduction in internal surface area. Specifically, the new articles of manufacture of my invention are obtained by extending a layer of inorganic sol upon the surface of a support liquid which is more dense than the sol and immiscible therewith; gelling the sol to obtain a gel sheet which contains sol liquid; exchanging the sol liquid in the gel sheet with one or more of a series of displacing liquids, at least the first of which is miscible with the sol liquid and at least the last of which is separable from the gel sheet by vaporization; and separating substantially all of the last liquid from the gel sheet by vaporizing it at a temperature of at least its critical temperature and under a pressure of at least the critical pressure of the final liquid; whereby, the vaporization of the displacing liquid is accomplished under conditions which prevent the formation of a two-phase liquid-vapor system within the gel pores.

My invention is applicable to inorganic sols, such as hydrosols and alcosols containing a substantial amount of water and/or alcohol, which are capable of forming aerogels. Illustrative of metals, the compounds of which form aerogels, are aluminum, silicon, magnesium, molybdenum, and various mixtures thereof. The metals can be employed in the form of their oxides and, at least in the case of aluminum, the phosphate form can be employed. With the exception of silica sols, the sols which can be converted are made by the conventional methods of the art. For example, the preparation of a number of suitable sols is set forth in an article by S. S. Kistler, Journal of Physical Chemistry, 36, 52–64 (1932), and an article by Kearby, Paper 134, Second International Congress on Catalysis, Paris, July 4–9, 1960.

A suitable silica sol is prepared by the reaction of ethyl orthosilicate in methanol solution with concentrated aqueous hydrochloric acid followed by filtration to remove any solid materials. Although this general method of preparing silica sols is known in the prior art, I have discovered that the proportions of reactants taught therein yield inferior products. To achieve the aforementioned desirable aerogel sheets, the reactant ratios should be about 0.07–0.08 mol ethyl orthosilicate, 0.5–0.7 mol methanol and 0.25–0.35 mol HCl per mol of water in the reaction mixture, and preferably 0.074 mol ethyl orthosilicate, 0.6 mol methanol and 0.3 mol HCl per mol of water.

A suitable alumina sol can be prepared according to known methods by dissolving high-purity aluminum in a dilute aqueous solution of acetic acid in the presence of a small amount of mercury or mecuric oxide to facilitate the reaction of the aluminum. The sol after preparation may be centrifuged in order to remove any unreacted aluminum or mercury or mercuric oxide. The sol may then be adjusted to contain, for example, from about 4 to about 10 weight percent $Al_2O_3$.

A suitable aluminum phosphate sol may be prepared according to known methods by reacting $AlCl_3 \cdot 6H_2O$, aqueous phosphoric acid and ethylene oxide, meanwhile maintaining thorough mixing of the reactants and concurrently cooling the reaction mixture to a low temperature, say about 0° C.

After the preparation of a particular sol is completed, it is floated upon the surface of a supporting liquid. The supporting liquid must have a density greater than the sol and must be immiscible with it. The self-sustaining, crack-free, thin sheets of inorganic aerogels are obtained because the absence of adhesive forces between the sol and the supporting liquid permits essentially free contraction of the sol as it is converted to a gel as will be hereinafter described. The reason such sheets cannot be formed upon solid supports without fragmentation and cracking is the presence of adhesive forces between the sol and the solid support. I have found that mercury and carbon tetrachloride are suitable support liquids in the practice of my invention.

The dimensions of the ultimate aerogel sheet are related to the dimensions of the layer of sol floated upon the supporting liquid. It will be apparent that the thickness of an aerogel sheet of any given area will be related to the characteristics of the particular sol from which it was produced and the thickness of the sol layer initially formed on the support liquid surface.

After extending the sol upon the support liquid the sol is gelled. The exact nature of the gelation step depends upon the nature of the particular sol being used. For example, an aluminum phosphate sol, prepared by the method of Kearby, supra, will gel in a reasonable length of time without the use of additional reagents or extremes of heat or pressure. Similarly, a silica sol prepared by the above-described method will gel in a reasonable length of time without subsequent chemical, heat, or pressure treatment. However, an alumina sol will not gel within a reasonable length of time unless special gelling techniques are employed. Although the mechanism is not completely understood some sols such as the alumina sols which otherwise require an inordinate length of time to gel can be readily gelled in a short time by treatment with a basic reagent. For example, an alumina sol can be readily gelled by passing ammonia vapors over the sol layer. The ammonia may be obtained from vapors of an aqueous ammoniacal solution or may be free ammonia. The duration of the ammonia treatment will vary depending upon the thickness of the sol layer and the type of sol. Desirably the rate of gelation is controlled to prevent introduced undesirable mechanical stresses in the sol layer as it is converted into gel form.

After the gelation step is complete, the resulting gel sheet is removed from the surface of the support liquid. At this point, the gel sheet is saturated with water or an aqueous alcohol solution or other liquid depending upon the sol from which it was made. If the sol liquid is separated from the gel sheet by conventional techniques, e.g. drying at ordinary temperatures and pressures, the gel structure will be damaged. One effect of conventional drying is to collapse the gel structure. This is believed to be a surface tension phenomena. Also, conventional drying techniques create mechanical stresses in the gel sheet which result in cracking and fragmentation of the sheet. These undesirable effects are eliminated by vaporizing the sol liquid under such conditions such that a two-phase system is never present in the gel structure, e.g. by vaporizing it at a temperature of at least its critical temperature and under a pressure of at least its critical pressure. In this way the undesirable stresses are substantially eliminated and the tendency to collapse the gel structure is reduced.

In most cases it is advantageous to displace the original sol liquid with a second liquid which is more easily vaporized and which does not collapse the gel structure when it is separated therefrom. Thus, for example, a silica gel sheet having reasonably acceptable properties may be obtained by vaporizing the original sol liquid at above its critical temperature and critical pressure. However, this does result in a measurable and substantial reduction in surface area. For best results the original sol liquid should be displaced by a second liquid such as methanol which is more easily removed by vaporization and which does not damage the gel structure when removed.

In general then the water, aqueous alcohol solution or other sol liquid in the gel sheet is removed by treating with a second displacing liquid which is miscible with the sol liquid and which can be vaporized from the gel sheet without affecting the physical characteristics of the sheet. To illustrate, water at elevated temperature tends to collapse an alumina gel and destroy the configuration of the sheet. However, a second liquid such as an oxygenated hydrocarbon, preferably having a low-boiling point, for example, methanol, ethanol, acetone or methyl ethyl ketone, can be used to displace the liquid originally present in the gel and can be readily vaporized from the gel as above described without injuring the gel structure.

In addition to its function as a displacing liquid for separating the sol liquid from the sheet, the displacing liquid may in certain instances be employed as a curing agent for enhancing certain desirable characteristcs of the gel sheet.

Under some circumstances it may be desirable to use a series of displacing and/or curing liquids in sequence. For example, the water in a gel sheet can be displaced by methanol and in turn the methanol can be displaced with ethanol. In other instance where methanol is the first displacing liquid, it can be displaced by acetone and the acetone in turn can be displaced by methyl ethyl ketone.

At any rate, the final displacing liquid in the series must be removed from the gel sheet under conditions which avoid the formation of cracks and fractures. This is accomplished by subjecting the sheet to pressure which is greater than the vapor pressure of the final displacing liquid at its critical temperature. Under these conditions when the liquid is heated to its critical temperature and above, it passes into the gas phase without two phases having been present within the gel sheet at any time; the simultaneous presence of two phases apparently contributes to the formation of crack-forming stresses in the gel. After the final displacing liquid has been transformed into the gas phase above its critical temperature, it is then expanded and removed from the vessel in which the heating was done prior to cooling the aerogel sheet. In this way condensation and absorption of the displacing liquid in the aerogel pores during cooling is prevented.

Any traces of residual organic matter remaining in the self-sustaining, substantially liquid-free aerogel sheet can be removed by calcining, suitably at temperatures in the range of about 450° to 750° C.

The calcined aerogel sheet has appreciable mechanical strength and with reasonable care can be handled without the danger of forming cracks. Its strength is great enough so that the configuration of the sheet may be adjusted as, for example, by abrasion.

Certain desirable properties of some of the specific aerogels can be enhanced by special treatment. For example, the mechanical strength of silica aerogel plates can be greatly improved by inserting a water curing step after the gelation step and prior to the removal of the final displacing liquid. After the silica sol has been gelled the sol liquid is displaced with a displacing liquid such as aqueous methanol. Then the methanol is displaced with water and the water saturated gel sheet is immersed in water for a time sufficient to impart the necessary mechanical strength to the sheet. If the curing water is cold, the time required may be several months. However, this time can be greatly reduced by heating the curing water. Thus, the curing step may be advantageously carried out at about 100° C., suitably in a closed autoclave, in about 4–8 hours. Thereafter the water in the sheet is displaced with methanol again and the methanol is then vaporized as above described to produce the dry plate which is then calcined as above. I have found that this water-curing step is necessary to produce silica aerogel plates having the requisite mechanical strength.

Another example of a desirable special treatment for a particular aerogel is found in the case of alumina aerogels which can be further strengthened by a second calcining step at a temperature in the region of about 1000° C.

To prepare catalysts in aerogel plate form, the desired catalyst components can be added during the original preparation of the sol or gel or in subsequent displacement procedures prior to removal of the liquid phase above the critical temperature. Various catalysts, such as silica-alumina and platinum-chloride-alumina, have been successfully made in clear aerogel plates. Alternatively, catalysts can be prepared by vapor phase deposition of catalytic materials on the aerogel plates. For example, aluminum-chloride on alumina aerogel may be formed by vapor phase deposition. Other methods of preparing catalysts supported on aerogel plates will be obvious to those skilled in the art.

Certain specific aerogel plates of my invention have unique and unexpected properties in addition to the crack-resistance common to all. For example, the aluminum phosphate aerogel sheets possess all of the crack-resistant properties of the other inorganic aerogels and in addition possess an unusually optical transparency which is substantially equal to that of ordinary glass. These aluminum phosphate aerogel sheets also have a much higher mechanical strength than either silica or alumina aerogel sheets, particularly in a high temperature environment. In addition to excellent transmission in the near ultraviolet visible and infrared regions of the spectrum, the aluminum phosphate aerogel sheets possess a very high porosity and internal surface area greater than 400 m.$^2$/g. The silica aerogel sheets have optical qualities which are almost as desirable as the aluminum phosphate sheets and, in addition, have an even higher internal surface area greater than 500 m.$^2$/g.

Example I

In this example the invention is illustrated with the preparation of a self-sustaining sheet of alumina aerogel.

The hydrosol was prepared by dissolving high-purity aluminum metal in an aqueous solution of acetic acid in the presence of a small amount of mercuric oxide. The sol was adjusted to a concentration of about 6 weight percent $Al_2O_3$. A layer of this sol, sufficient to provide an ultimate aerogel sheet of about 50 mm. diameter, was floated on the surface of a pool of mercury. The alumina sol was of such character that the 50 mm. diameter aerogel sheet ultimately formed had a thickness of about 3 mm.

The layer of sol was converted at room temperature to a sheet of gel by passing vapors from a 10 percent aqueous ammonia solution over the layer for about two hours. The gel sheet was removed from the mercury and immersed in methanol. The immersion of the gel sheet in methanol was repeated several times with fresh methanol to assure complete displacement of the sol water. The methanol was then exchanged with 95 percent ethanol using a similar immersion procedure.

The gel sheet saturated with ethanol was placed in an autoclave filled with ethanol, and the temperature was slowly raised to 300° C. while maintaining a pressure of about 1500 p.s.i. Removal of the ethanol required about two hours. While maintaining the elevated temperature, the ethanol vapors were evacuated from the autoclave and were substituted with air. The autoclave was then cooled to room temperature, the aerogel sheet was removed from the autoclave, placed in a muffle furnace, and calcined at 600° C.

The calcined aerogel sheet was 50 mm. in diameter and 3 mm. in thickness. A close examination of the sheet showed it to be crack-free with parallel surfaces. It was strong enough to handle without cracking and was shaped by abrading without developing cracks. Electron micrographs showed uniform open-pore structure. The optical properties and dimensional characteristics of the aerogel sheet were substantially the same as the initial hydrogel sheet indicating that the internal structure of the hydrogel sheet was substantially preserved in the aerogel sheet.

In white light this alumina aerogel sheet was transparent and opalescent. This sheet was markedly more transparent in red light.

Example II

In this example the invention is illustrated with the preparation of a self-sustaining sheet of aluminum phosphate aerogel.

The aluminum phosphate sol was made as described by Kearby, supra, by the reaction of aluminum chloride, phosphoric acid and ethylene oxide accompanied by thorough mixing and cooling to about 0° C. Upon incipient gelation, the reaction mixture was poured upon a large mercury surface. After the firm gel had been formed (2–16 hours), the gel plates were lifted from the surface of the mercury and were treated with anhydrous methanol. The methanol treating step whereby the sol liquid was displaced required one to two weeks equilibration time during which period the methanol was changed and replaced with fresh anhydrous methanol four times. The aerogel was converted to the dry aerogel in an autoclave at 270–300° C. and 1000–1500 lbs./m.$^2$ pressure by the method described in Example I. Subsequently, the aerogel plates were calcined in oxygen and in air at 600° C. for several hours to remove organic residues.

A close examination of the sheet thus produced showed it to be crack-free and having an optical transparency approximating that of the initial hydrogel sheet and also of ordinary glass. The internal surface area of the final aerogel was in excess of 400 m.$^2$/g. The mechanical strength of the aluminum phosphate aerogel produced in this example was much greater than that of the alumina aerogel of Example I. This mechanical strength was not appreciably reduced at a temperature of 1000° C.; the melting point of this aerogel is greater than 1500° C.

Example III

This example illustrates the invention with the preparation of a self-sustaining sheet of silica aerogel.

50 ml. of a solution of 40 volume percent ethyl orthosilicate in C.P. methanol was mixed with 30 ml. of aqueous 37.5 weight percent HCl and filtered. The filtered mixture was poured onto the surface of mercury held in a crystallization dish 7¼″ in diameter. The dish was covered with a large watch glass and allowed to stand undisturbed. Gelation was complete in 3 hours yielding a crack-free, transparent gel sheet. The sheet was broken into convenient size plates which were immersed consecutively in 50 percent aqueous methanol, 25 percent aqueous methanol and finally in three successive baths of distilled water. The silica gel sheet, saturated with water, was then heated in water at 100° C. in a closed autoclave for 4 hours. After removal from the autoclave, the plates were transferred through 5 successive washes (400 ml. each) of C.P. methanol and finally converted to the dry aerogel plates as described in Example I.

The finished silica aerogel plates were flat, transparent and slightly opalescent and were uncracked. They were calcined in air at 600° C. with no cracking, warping or loss of transparency. The internal surface area was about 800 m.$^2$/g. On heating in vacuum at 700° C. for several days and at 800–900° C. for several hours there was no deterioration in optical or mechanical properties and only a very slight loss in surface area. The plates were not damaged by contact with humid air.

While I have illustrated my invention with examples showing the preparation of specific self-sustaining, thin, crack-free inorganic aerogel plates having unique and highly desirable optical, mechanical strength, internal surface area, density, and porosity characteristics, it is to be understood that I do not intend to thereby limit the scope or spirit of my invention to the specific examples presented for purposes of illustration. In accordance with my invention, involving the combination of a specific manner of gel sheet formation, subsequent sol liquid displacement, and liquid removal steps, a wide variety of sols of inorganic compounds, for which the methods of preparation and gelling are already known and described in the prior art, can be converted to the desired self-sustaining aerogel plates. Thus, for example, sols of mixtures of alumina and silica as well as to sols of the oxides of chromium, molybdenum, and mixtures of aluminum and chromium can be converted to thin, crack-free aerogel plates. The particular sol to be used to obtain an aerogel sheet having certain desired properties ay be ascertained by routine experimentation by person of ordinary skill having regard for the invention I have disclosed herein.

I claim:

1. The article of manufacture consisting of a self-sustaining, thin, crack-free sheet of inorganic aerogel prepared from a corresponding inorganic sol by the process comprising:

(a) floating a thin layer of an inorganic sol on the surface of an immiscible support liquid having a density greater than the density of said sol;

(b) gelling said sol layer on said support liquid to form thereon a gel sheet containing sol liquid in said gel sheet;

(c) exchanging said sol liquid with a displacing liquid which is miscible therewith and separable from the gel sheet by vaporization; and (d) separating said displacing liquid from said gel sheet by vaporizing said displacing liquid at a temperature of at least its critical temperature and at a pressure of at least its critical pressure and removing said vaporized liquid at said temperature and pressure without the formation of a two-phase liquid-vapor system within the gel structure of said gel sheet thereby forming said aerogel sheet.

2. The article of claim 1 wherein said inorganic sol and aerogel is alumina.

3. The article of claim 1 wherein said inorganic sol and aerogel is aluminum phosphate.

4. The article of claim 1 wherein said inorganic sol and aerogel is silica.

5. The article of claim 4 wherein said silica sol is formed by reacting a methanol solution of ethyl orthosilicate with concentrated aqueous hydrochloric acid wherein the mol ratios of reactants are 0.07–0.08 mol of ethyl orthosilicate, 0.5–0.7 mol of methanol and 0.25–0.35 mol of HCl per mol of water in the reaction mixture.

6. The article of claim 1 wherein the aerogel is calcined.

References Cited

UNITED STATES PATENTS

| | | | |
|---|---|---|---|
| 661,250 | 11/1900 | Lombardi | 264—298 |
| 2,249,767 | 7/1941 | Kistler | 252—317 X |
| 2,783,894 | 3/1957 | Lovell et al. | 210—203 |

RICHARD D. LOVERING, *Primary Examiner.*

U.S. Cl. X.R.

23—143; 252—317; 264—233, 298, 344